(12) United States Patent
Pereira et al.

(10) Patent No.: US 11,279,284 B2
(45) Date of Patent: Mar. 22, 2022

(54) METHOD FOR DETERMINING A STATE OF A TAILGATE OF A PICKUP VEHICLE BY ANALYSIS OF A REGION OF INTEREST, COMPUTER PROGRAM PRODUCT, ELECTRONIC COMPUTING DEVICE AS WELL AS CAMERA SYSTEM

(71) Applicant: Connaught Electronics Ltd., Tuam (IE)

(72) Inventors: Leroy Francisco Pereira, Tuam (IE); Ciaran Hughes, Tuam (IE); Mahesh Kondiparthi, Chennai (IN); Chanchal Raj, Chennai (IN)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 17/121,972

(22) Filed: Dec. 15, 2020

(65) Prior Publication Data
US 2021/0188169 A1    Jun. 24, 2021

(30) Foreign Application Priority Data
Dec. 19, 2019  (DE) .................... 10 2019 135 192.8

(51) Int. Cl.
*B60R 1/00* (2006.01)
*G06K 9/00* (2006.01)
*G06K 9/32* (2006.01)

(52) U.S. Cl.
CPC .......... *B60R 1/002* (2013.01); *G06K 9/00791* (2013.01); *G06K 9/3233* (2013.01); *B60R 2300/60* (2013.01); *B60R 2300/8066* (2013.01)

(58) Field of Classification Search
CPC ..... B60R 1/002; B60R 1/003; B60R 2300/60; G06K 9/3233; G06K 9/3241
(Continued)

(56) References Cited

U.S. PATENT DOCUMENTS

| 6,339,375 B1 * | 1/2002 | Hirata | G01V 8/10 187/317 |
| 2004/0193413 A1 * | 9/2004 | Wilson | H04N 13/128 704/243 |

(Continued)

FOREIGN PATENT DOCUMENTS

| DE | 102018101592 A1 | 8/2018 |
| DE | 102018129070 A1 | 5/2019 |

OTHER PUBLICATIONS

German Serach Report issued in corresponding German Application No. 102019135192.8, dated Nov. 25, 2020. (59 Pages).

(Continued)

*Primary Examiner* — Nathnael Aynalem
(74) *Attorney, Agent, or Firm* — Osha Bergman Watanabe & Burton LLP

(57) ABSTRACT

A method for determining a state of a tailgate (9) of a pickup vehicle (1) by a camera system (2), includes capturing a cargo bed (5) of the pickup vehicle (1) in an image (8) captured by a camera (3), determining a first region of interest (ROI1) in the captured image (8) by an electronic computing device (4) of the camera system (2), wherein the first region of interest (ROI1) includes the potential tailgate (9) at least partially, determining a parameter optically characterizing the tailgate (9) depending on the captured image (8), analyzing the first region of interest (ROI1) with regard to the characterizing parameter, and determining a closed state of the tailgate (9) as state or determining an opened state of the tailgate (9) as state depending on the analysis of the first region of interest (ROI1). A computer program product, an electronic computing device (4) as well as a camera system (2) are also disclosed.

13 Claims, 2 Drawing Sheets

Figure 1:
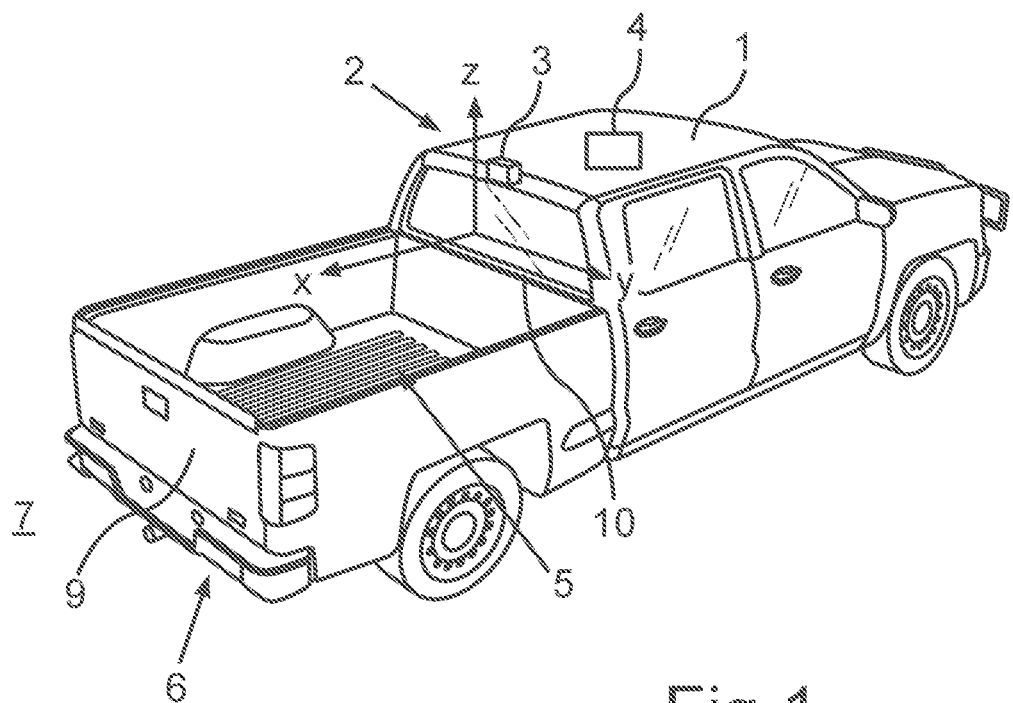

(58) Field of Classification Search
USPC .......................................................... 348/148
See application file for complete search history.

(56) References Cited

U.S. PATENT DOCUMENTS

| | | | |
|---|---|---|---|
| 2015/0054950 A1* | 2/2015 | Van Wiemeersch | ........................ G06T 7/0008 348/148 |
| 2017/0371231 A1* | 12/2017 | Shintani | ................... H04N 1/00 |
| 2019/0152387 A1* | 5/2019 | Naserian | ................. B60Q 9/00 |
| 2020/0391751 A1* | 12/2020 | Fujiyoshi | ........... G06K 9/00805 |

OTHER PUBLICATIONS

TheAILearner: Histogram backprojection, URL: theailearner.com/2019/04/18/hi stogram-backprojection/ vom 18.04.2019 [abgerufen am Nov. 24, 2020] (7 Pages).

Swain, M. J.; Ballard, D. H.:Indexing via color histograms. In: Proceedings 3rd International Conference on Computer Vision, 1990, pp. 390-393. URL: doi.org/10.1109/ICCV.1990.139558 (15 Pages).

Ballard, Dana H; Brown, Christopher M: Computer Vision. Prentice Hall, 1982. URL: homepages inf.ed.ac.uk/rbf/BO OKS/BANDB/bandb.htm (4 Pages).

* cited by examiner

METHOD FOR DETERMINING A STATE OF A TAILGATE OF A PICKUP VEHICLE BY ANALYSIS OF A REGION OF INTEREST, COMPUTER PROGRAM PRODUCT, ELECTRONIC COMPUTING DEVICE AS WELL AS CAMERA SYSTEM

The invention relates to a method for determining a state of a tailgate of a pickup vehicle by using a camera system of the pickup vehicle. Further, the invention relates to a computer program product, an electronic computing device as well as a camera system.

From the prior art already pickup vehicles, which can also be referred to as pickup, are known, which have a cargo bed, wherein the cargo bed can be closed in particular by a tailgate. In particular the tailgate can be swung between a closed position and an open position. In the closed position the cargo bed forms a cargo space that is open towards the top. In the open position at least on the side of the tailgate this cargo space is opened so that a loading from a tailgate side of the motor vehicle via the tailgate is facilitated.

Further it is known that on a pickup vehicle, in particular in the region of the third rear light, a camera is arranged. This camera is also referred to as Center High Mount Stop Light Camera (CHMSL Camera). This camera is arranged in such a way on the pickup vehicle that it can capture a rear region of the motor vehicle. In particular the camera in this connection captures a cargo bed of the motor vehicle.

It is the objective of the present invention to provide a method, a computer program product, an electronic computing device as well as a camera system, by means of which in a simplified way a state of a tailgate of the pickup vehicle can be determined.

This objective is achieved by a method, a computer program product, an electronic computing device as well as a camera system according to the independent patent claims. Advantageous embodiments are indicated in the subclaims.

One aspect of the invention relates to a method for determining a state of a tailgate of a pickup vehicle by using a camera system of the pickup vehicle. A capturing of a cargo bed of a motor vehicle in an image captured by a camera of the camera system is effected. A determining of a first region of interest in the captured image by using an electronic computing device of the camera system is effected, wherein the first region of interest includes the potential tailgate at least partially. A determining of a parameter characterizing the tailgate optically is effected depending on the captured image. An analysis of the first region of interest with regard to the characterizing parameter is effected. A determining of the closed state of the tailgate as state is effected or a determining of an opened state of the tailgate as state depending on the analysis of the region of interest.

Thereby it is facilitated that by an image analysis of the camera the state of the tailgate can be captured. Thus, it is for instance possible that without any additional contact switch already the camera system on the motor vehicle corresponding to the pickup vehicle is used in order to be able to also determine a state of the tailgate. Thereby in a simplified and in particular component-reduced way the state of the tailgate can be determined.

In the following in particular as the longitudinal direction of the motor vehicle or the pickup vehicle an x axis is to be regarded. As the transverse axis of the motor vehicle in particular a y axis is to be regarded. As the vertical axis of the motor vehicle in particular a z axis is to be regarded.

The camera is in particular a central high-mounted camera in the region of the third brake light of the pickup vehicle. This camera is also referred to as Center High Mount Stop Light Camera (CHMSL camera). By the camera it is in particular facilitated that a cargo bed of the motor vehicle can be captured. The pickup vehicle can in particular also be referred to as pickup vehicle. The camera in particular is already mounted on the motor vehicle and for instance configured for observation of a trailer arranged on the pickup. Additionally now the state of the tailgate can be captured by the method according to the invention.

The orientation error is in particular an error of the camera setup. In other words, the camera can have been incorrectly set up/mounted in particular with respect to the three motor vehicle axes (longitudinal axis, transverse axis, vertical axis) for example in mounting the camera. Thus, the camera can in particular have an actual pose, which deviates from a desired pose, in particular of a reference camera. This deviation is referred to as orientation error.

In particular, the camera can be disposed at a rearward directed stoplight/brake light, which can also be referred to as third stoplight/brake light. In particular, the camera can be formed as a separate component to the stoplight or as an integral constituent of the stoplight.

Preferably, it can be provided that for recognizing the calibration object, hence the cargo bed, within the captured image, a corresponding evaluation of the image, for example by means of an image processing program, is performed.

In particular, it can be provided that the calibration object is a part of the motor vehicle and thus not a separate component. Thus, the determination of the correction value can be performed reduced in effort and without additional component. Furthermore, the determination of the correction value can be performed by means of the method within an image, in other words, without having to capture a further image.

According to an advantageous embodiment at least the first region of interest in dependence on a histogram backprojection is determined. In particular thereby it can be determined where the colours within the region of interest are that belong to the target object, in the present embodiment the tailgate. In the histogram backprojection the tailgate in the present embodiment is represented by a histogram M. Depending on the first region of interest then a histogram I is generated, which in particular describes the region of interest. A third histogram R is generated, which represents the ratio of M divided by I.

The histogram R is then backprojected onto the captured image, wherein the image values are replaced by the values of R. In this connection the following formulas are used:

For each histogram bin, $R_j$ is determined:

$$R_j = \frac{M_j}{I_j}, \; j = 1, 2, \ldots, 255;$$

Determining the backprojection:

$$b_{x,y} := \min(R_{(M_{x,y})}, 1);$$

Convolving the backprojection with a disc kernel $D_r$ so that:

$$D_{x,y}{}^r = (1 \text{ if } \sqrt{x^2+y^2} < r; \; 0 \text{ otherwise}), \text{ wherein } r \text{ corresponds to the disc radius;}$$

By using the histogram backprojection it is facilitated in a simple way that corresponding pixel values for the tailgate are generated so that the state of the tailgate can be reliably determined.

It has further turned out to be advantageous if a second region of interest is determined, which at least partially includes the cargo bed, and the characterizing parameter is determined depending on the second region of interest. In particular this method is a static capturing. In other words, it is envisaged that the pickup vehicle does not move and in the unmoved state by the second region of interest then again the state of the tailgate can be determined. For this purpose it is in particular required that in a first step the cargo bed is isolated from the further background in the image. For this purpose in particular a histogram backprojection is required. For generating the second region of interest for instance size parameters of the motor vehicle can be used, which in particular are predetermined by the electronic computing device. For instance part of the cargo bed, which in particular is positioned very close to the camera, for instance a front side part of the cargo bed, can be captured. By the histogram backprojection in particular a binary mask for the region of interest, in particular for the second region of interest, can be generated. Thereby it is facilitated that in a simple way the optically characterizing parameter is determined so that the analysis of the first region of interest can be carried out, whereby in particular the state of the tailgate can be captured in an improved way.

Further, it has turned out to be advantageous, if of the first region of interest a first histogram is generated and of the second region of interest a second histogram is generated and as characterizing parameter a pixel value in the histograms is determined and by comparison of the first histogram with the second histogram as analysis based on a contrast comparison the state of the tailgate is determined. The first region of interest is in particular configured on a top edge of the tailgate. The top edge of the tailgate can in particular be determined on the basis of the size indications of the cargo bed. Should the loading edge and the tailgate be closed, the contrast of the first region of interest substantially corresponds to the contrast of the second region of interest, whereby in particular based on the contrast comparison it can be determined that similar pixel values in the first region of interest and in the second region of interest are present. Should the tailgate be opened, in the contrast comparison the pixel values differ. Thereby it is facilitated that in a simple way optically the state of the tailgate can be captured.

Further it is advantageous if in the case of a predetermined number of non-zero pixel values of the pixel values the closed state is determined and in the case of a predetermined number of zero pixel values the pixel values of the opened state is determined. In particular should a large number of non-zero pixel values occur, in particular in the first region of interest, the closed state of the tailgate can be captured.

Should the other case occur, in other words should a multitude of zero pixels, in other words of zero pixel values occur, it can be assumed that the opened state of the tailgate is current. Thereby it is facilitated that the opened state of the tailgate is current. Thereby it is facilitated that by a simple analysis of the pixel values the state of the tailgate can be determined.

In a further advantageous embodiment additionally the first region of interest is analyzed by a Hough transformation and depending on this analysis the state of the tailgate is determined. In particular this has the background that, should during the optical capturing be found that the contrast between the motor vehicle body and the environment is not very big, for instance when the tailgate is opened and the motor vehicle driving and for instance driving on a black ground, in the contrast comparison the state of the tailgate cannot be determined at any time. Thereby it is facilitated to capture by the Hough transformation additional corresponding lines within the first region of interest. The lines are in particular lines, which are formed on the tailgate. In particular these are crosslines.

Should these crosslines now be captured by the Hough transformation, it can be assumed that the tailgate is closed. Should the lines not be captured, it can be assumed that the tailgate is opened. Alternatively or additionally, the state of the tailgate can be verified by being able to proceed based on the assumption that the tailgate has three edges. In particular a horizontal as well as two lateral edges. If the combination of the three edges is optically captured, an opened state of the tailgate can be assumed. Should the three edges not be captured, the closed state of the tailgate can be assumed.

According to a further advantageous embodiment the first region of interest is determined depending on at least one predetermined size indication of the cargo bed. In other words for instance it can be predetermined to the electronic computing device how large the cargo bed is. For instance a width of the cargo bed, a length of the cargo bed and a height of the cargo bed of the electronic computing device can be predetermined. Based on these values then by means of the electronic computing device additionally the cargo bed can be correspondingly analyzed. In particular thereby it can for instance be determined at which place in the image the potential tailgate is situated. Further it can be predetermined at which place the potential second region of interest is situated. Thereby it is facilitated that in a simple way the first region of interest and the second region of interest can be predetermined, whereby in a simple way again the state of the tailgate can be determined.

Further, it has proven to be advantageous if the first region of interest is determined depending on at least one extrinsic parameter of the camera. In particular the at least one extrinsic parameter is predetermined. In particular for the method according to the invention it is necessary that the nominal position of the camera is known. The extrinsic parameters are in particular a rotation parameter and a translation parameter of the camera. Should for instance the camera have an incorrect orientation, this may be compensated for by the corresponding corrections in the image. By a corresponding correction of the incorrect orientation of the camera the opened or closed state of the tailgate can be determined in an improved way.

It is further advantageous if the first region of interest is subdivided into a multitude of subregions and for a respective subregion a respective motion vector of the subregion is determined as characterizing parameter and depending on the multitude of the determined motion vectors for the multitude of the subregions the state of the tailgate is determined. In particular herein the motor vehicle is in a moving state. In other words the motor vehicle is in a driving operation. In particular therein then several images of the camera can be analyzed so that the movement state of the motor vehicle can be reliably determined. The first region of interest can then be generated in particular based on size indications of the motor vehicle in the region of the tailgate. The first region of interest is then in particular subdivided into a multitude of smaller subregions, for instance of the size of 8 by 8 or 16 by 16. If the motor vehicle is in motion, it can thus be determined whether a movement vector within the region of interest, in particular within the subregion, is present. Should no motion vector or only a minor motion vector be able to be captured, it can be assumed that the tailgate is in a closed state. Should the tailgate be opened, a corresponding motion vector can be captured, since in particular at the place of the region of interest the moving road is captured. Thus in a simple way on the basis of the motion vectors also in the moving state of the motor vehicle the state of the tailgate can be reliably determined.

In a further advantageous embodiment by analysis of an optical flow within the respective subregion the respective motion vector is determined. In particular this can for instance be determined with a Sum of Squared Differences (SSD) or the Sum of Absolute Differences (SAD). Thereby it can reliably be determined whereby the state of the tailgate can be reliably determined.

Further, it has turned out to be advantageous if based on a contrast comparison in the image and based on a motion vector analysis in the image the state of the tailgate is determined. In particular the contrast comparison is performed in a static movement state of the motor vehicle and the analysis of the movement vectors during a dynamic state of the motor vehicle. In particular, should both be performed, this has the advantage that the corresponding disadvantages of the individual methods are overcome. Should for instance the contrast difference between the pickup vehicle and the environment not be significant, for instance when the tailgate is opened and the motor vehicle is moving on a black ground, by the dynamic method this obstacle can be overcome. In particular by a combination of the motion vector analysis and the contrast comparison an improved method can be provided in order to determine the state of the tailgate. In particular for instance by the formula:

$$\text{Criterion}_{tailgate} = (\text{weight}_{static} * \text{Output}_{static}) + (\text{vehicleMotion}) * (\text{weight}_{dynamic} * \text{Output}_{dynamic});$$

the state of the tailgate can be reliably determined. In particular thereby a criterion value can be determined, which can be used to decide that the tailgate is opened or closed.

Both the static method as well as the dynamic method therein are assigned a predetermined weighting value. The criterion can subsequently be converted to a percentage value, which can be interpreted as a likelihood of the open state of the tailgate.

A further aspect of the invention relates to a computer program product with program code means, which are stored in a computer-readable medium in order to perform the method for determining a state of a tailgate according to the preceding aspect, if the computer program product is executed on a processor of an electronic computing device.

Yet a further aspect of the invention relates to an electronic computing device with a computer program product according to the preceding aspect.

Yet a further aspect of the invention relates to a camera system for a pickup vehicle comprising at least one camera and an electronic computing device according to the preceding aspect, wherein the camera system is configured for performing a method according to the preceding aspect. In particular the method is performed by using the camera system.

Yet a further aspect of the invention relates to a pickup vehicle comprising a camera system according to the preceding aspect.

Advantageous embodiments of the method are to be regarded as advantageous embodiments of the computer program product, of the electronic computing device, as well as the camera system. The camera system as well as the electronic computing device for this purpose comprise substantive features, which facilitate a performing of the method or an advantageous embodiment thereof.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by the separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the back-references of the claims.

The invention is now explained in more detail based on preferred embodiments as well as by reference to the enclosed drawings.

Figure 2:
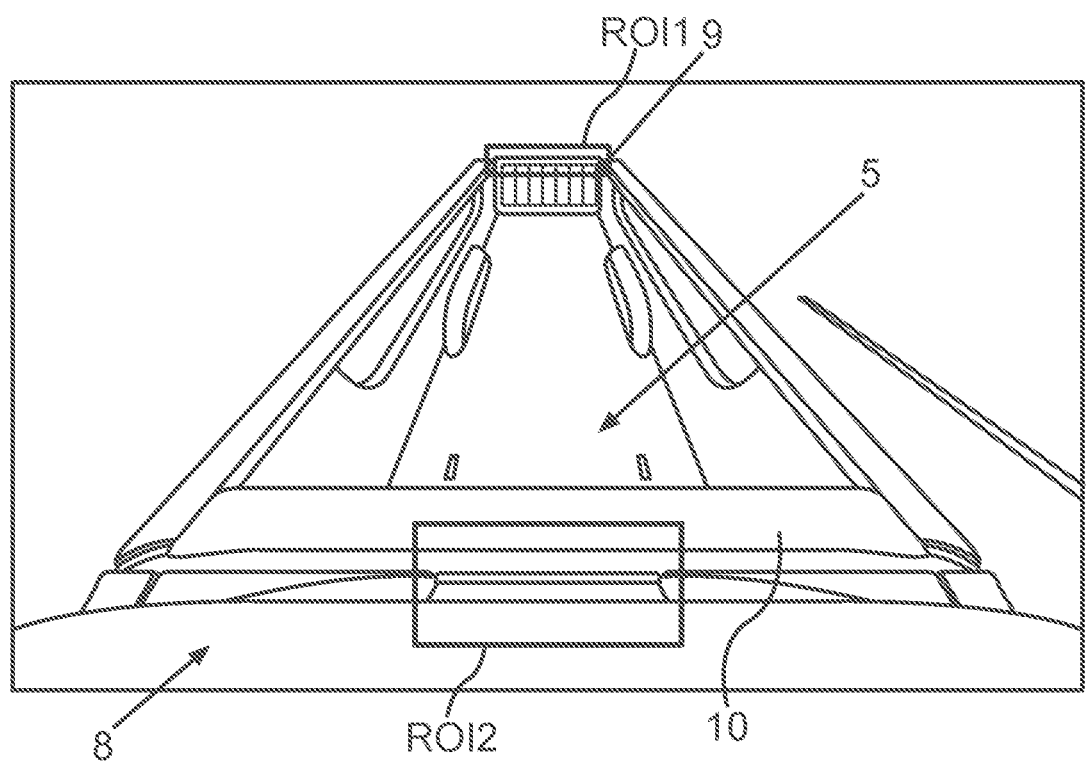
Figure 3:
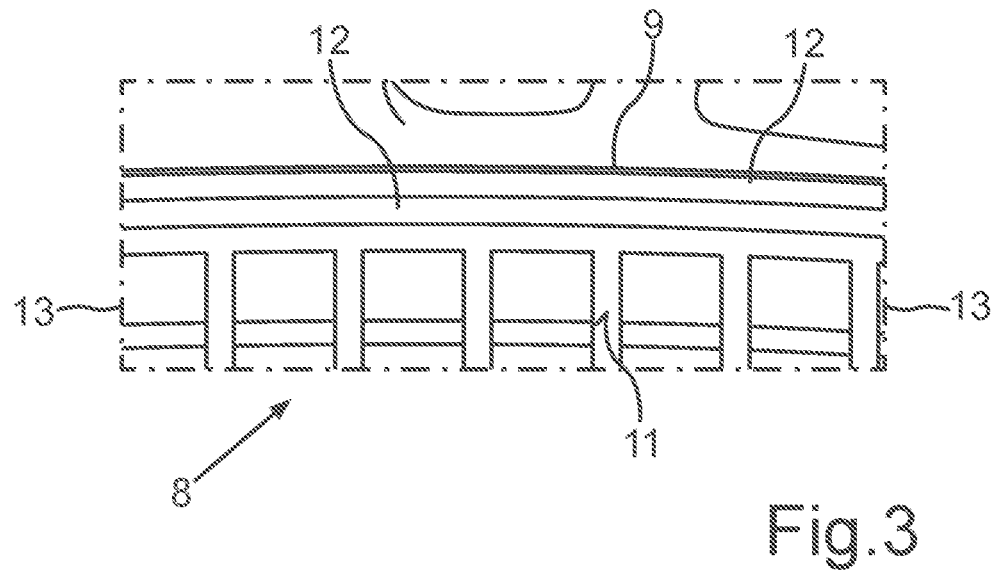

These show in:

FIG. 1 a schematic perspective view of an embodiment of a pickup vehicle comprising an embodiment of a camera system;

FIG. 2 a schematic perspective view of a taken image;

FIG. 3 a further schematic view of a taken image; and

Figure 4:
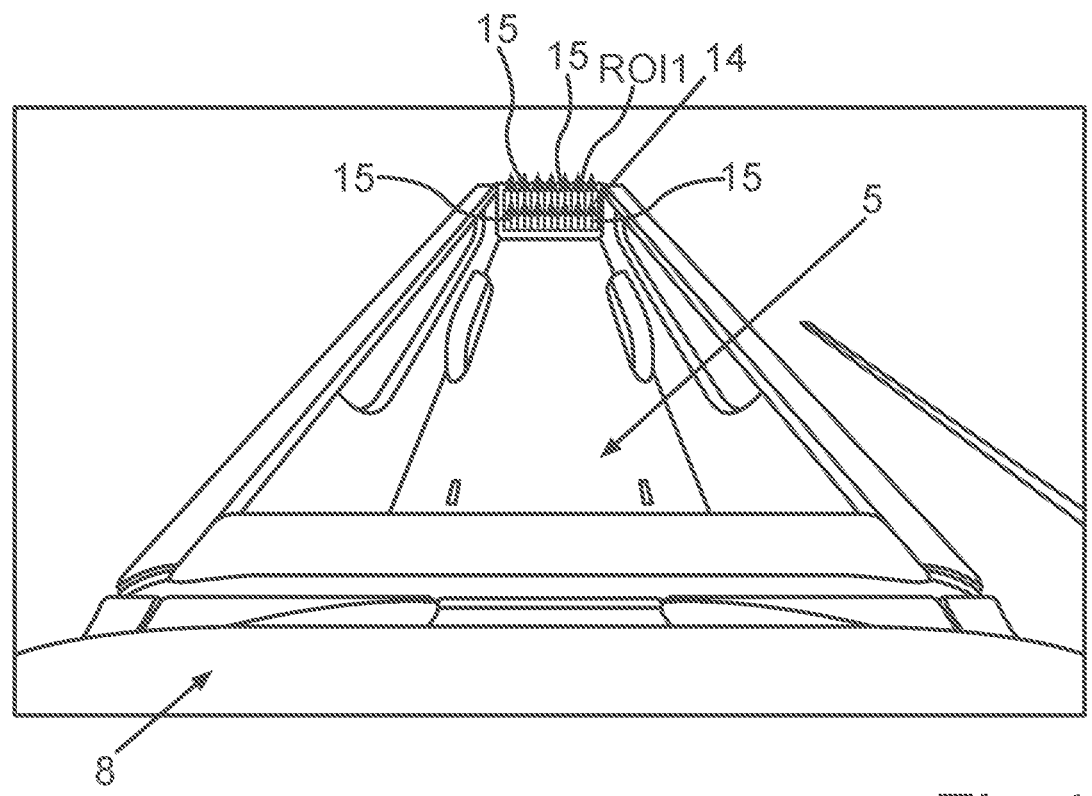

FIG. 4 yet a further schematic view of a taken image.

In the figures same elements or elements having the same function are equipped with the same reference signs.

FIG. 1 in a schematic perspective view shows an embodiment of a pickup vehicle 1 comprising an embodiment of a camera system 2. The pickup vehicle 1 is in particular a motor vehicle. The camera system 2 comprises at least one camera 3 as well as an electronic computing device 4. The camera 3 is in particular configured as central high-mounted braking lamp camera. In other words, it is in particular envisaged that by means of the camera 3 a cargo bed 5 of the pickup vehicle 1 can be captured. The camera 3 thus is oriented in the direction of a tailgate 6 of the pickup vehicle 1 so that a rear space 7 of the pickup vehicle 1 can be captured.

The camera 3 in particular is a central high-mounted camera 3 in the region of the third brake light of the pickup vehicle 1. This camera 3 is also referred to as Center High Mount Stop Light Camera (CHMSL Camera). By means of the camera 3 it is in particular facilitated that a cargo bed 5 of the motor vehicle can be captured. The pickup vehicle 1 can in particular also be referred to as pickup vehicle. The camera 3 is in particular already mounted on the motor vehicle and for instance configured for observation of a trailer arranged on the pickup. Additionally now the state of a tailgate 9 can be captured by the method according to the invention.

FIG. 2 in a schematic view shows an embodiment of an image 8 taken by the camera 3.

The image 8 shows in particular the cargo bed 5.

In the method for determining a state of the tailgate 9 of the pickup vehicle 1 by the camera system 2 a capturing of the cargo bed 5 of the pickup vehicle 1 is effected by means of the camera 3 of the camera system 2. A determining of a first region of interest ROI1 in the captured image 8 by means of the electronic computing device 4 of the camera system 2 is effected, wherein the first region of interest ROI1 includes the potential tailgate 9 at least partially. A determining of a parameter optically characterizing the tailgate 9 depending on the captured image 8 is effected. An analyzing of the first region of interest ROI1 with regard to the characterizing parameter is effected and a determining of a closed state of the tailgate 9 as state or a determining of an opened state of the tailgate 9 as state depending on the analysis of the first region of interest ROI1 is effected.

In what is shown in FIG. 2 it can here in particular be seen that the first region of interest ROI1 is determined depending on a histogram backprojection. In particular FIG. 2 shows the histogram backprojection.

For determining the state of the tailgate 9 it is in particular envisaged that a second region of interest ROI2 is determined, which at least partially includes the cargo bed 5, and the characterizing parameter is determined depending on the second region of interest ROI2.

In the following embodiment the second region of interest ROI2 is in particular a front part of the cargo bed 5. In particular the second region of interest ROI2 is a front edge 10 of the cargo bed 5. FIG. 2 shows in particular that by a first region of interest ROI1 a first histogram is generated and by the second region of interest ROI2 a second histogram is generated and as characterizing parameter a pixel value in the histograms is determined and by comparison of the first histogram with the second histogram as analysis based on a contrast comparison the state of the tailgate 9 is determined.

Further, it is in particular envisaged that in the case of a predetermined number of non-zero pixel values the pixel values of the closed state is determined and in the case of a predetermined number of zero pixel values of the pixel values in the opened state is determined.

In other words FIG. 2 shows in particular that the pickup vehicle 1 is in a static state. For this purpose in a first state the capturing of the cargo bed 5 within the image 8 is effected.

In particular the capturing of the cargo bed 5 is effected by means of histogram backprojection. Then the determining of the first region of interest ROI1 and the determining of the second region of interest ROI2 is effected. In particular herein size indications of the pickup vehicle 1, in particular the cargo bed 5, can be used in order to determine the region of interest ROI1, ROI2 accordingly. These size indications are in particular predetermined and can thus be utilized by the electronic computing device 4 for analysis.

In particular it is envisaged that in the case of a predetermined number of non-zero pixel values of the pixel values the closed state is determined and in the case of a predetermined number of zero pixel values of the pixel values in the opened state is determined. In particular in the case of a large number of non-zero pixel values within the first region of interest ROI1 it can be determined that the tailgate 9 is closed, whereas in the case of a large number of zero pixel values it can be concluded that the tailgate 9 is opened.

FIG. 3 in a schematic perspective view shows the image 8. In particular FIG. 3 shows an enlarged view of the tailgate 9 from an inside 11. In particular FIG. 3 shows that additionally the first region of interest ROI1 is analyzed by a Hough transformation 12 and depending on this analysis the state of the tailgate 9 is determined. In particular this has its background in the fact that, should for instance due to a low contrast comparison, since for instance the difference of pickup vehicle 1 from an environment is not significant, because for instance the tailgate 9 is opened and the motor vehicle moves on a dark ground, by the Hough transformation 12 it can additionally be verified in which state the tailgate 9 is. This has its background in particular in the fact that by the Hough transformation 12 in the first region of interest ROI1 a corresponding line can be detected when the tailgate 9 is in the closed state. The line cannot be detected when the tailgate 9 is in an opened state. Yet again additionally it may be envisaged that based on an edge recognition it can be verified whether the tailgate 9 is opened or closed. For this purpose it is in particular envisaged that in the closed state of the tailgate 9 merely a top edge 12 of the tailgate 9 can be captured. In the opened state also the two lateral edges 13 can be captured, whereby it can be reliably determined whether the tailgate 9 is in an opened state or in a closed state.

FIG. 4 in a schematic perspective view shows a further image 8. It can in particular be envisaged that the first region of interest ROI1 is determined depending on at least one predetermined size indication of the cargo bed 5. Further it can in particular be envisaged that the first region of interest ROI1 is determined depending on at least one extrinsic parameter of the camera 3. In particular the at least one extrinsic parameter is predetermined. In particular for the method according to the invention it is necessary that the nominal position of the camera 3 is known. The extrinsic parameters are in particular one rotation parameter and one translation parameter of the camera 3. Should for instance the camera 3 have an incorrect orientation, this can be compensated for by corresponding corrections in the image 8. By a corresponding correction of the incorrect orientation of the camera 3 the opened or the closed state, respectively, of the tailgate 9 can be determined in an improved way.

Further FIG. 4 shows in particular that the first region of interest ROI1 is subdivided into a multitude of subregions 14 and for a respective subregion 14 a respective motion vector 15 of the subregion 14 as characterizing parameter is determined and depending on the multitude of the determined motion vectors 15 for the multitude of the subregions 14 the state of the tailgate 9 is determined. In particular in FIG. 4 the pickup vehicle 1 is in a dynamic state, in particular a moved state. By the camera 3 in particular a multitude of images 8 is taken so that the motion vectors 15 can be reliably captured. The analysis for the respective motion vectors 15 is effected in particular on the basis of an optical flow within the respective subregions 14 within the multitude of the taken images 8.

For instance for this purpose it may be envisaged that the first region of interest ROI1 is subdivided into the subregions 14, wherein these for instance form a 8 by 8 or 16 by 16-matrix. When the pickup vehicle 1 is in motion, the optical flow is determined, wherein this is performed for instance by the Sum of Squared Differences (SSD) or by the Sum of Absolute Differences (SAD). It can then be concluded that the tailgate 9 is closed, if the movement vectors 15 are nearly 0, since in particular the camera 3 and the tailgate 9 are fixed on the pickup vehicle 1 so that no relative movement of the camera 3 towards the closed tailgate 9 can be determined. On the other hand, if the movement vector 15 is captured as being large, in particular larger than a predetermined threshold value, it can be concluded that the tailgate 9 is in the opened state, since in particular the road is captured and not the tailgate 9 as such.

In particular it may be envisaged that on the basis of a contrast comparison in the image 8 and based on a movement vector analysis in the image 8 the state of the tailgate 9 is determined. In other words it can in particular be envisaged that both by the contrast comparison as it is in particular represented in FIG. 2, as well as by the motion vector analysis, as it is in particular represented in FIG. 4, additionally the state of the tailgate 9 can be determined. In particular this can then for instance be performed based on the formula:

$$\text{Criterion}_{tailgate} = (\text{weight}_{static} * \text{Output}_{static}) + (\text{vehicleMotion}) * (\text{weight}_{dynamic} * \text{Output}_{dynamic});$$

The invention also relates to a computer program product with program code means, which are stored in a computer-readable medium, in order to perform the method for determining a state of the tailgate 9, as it is shown in FIG. 1 to FIG. 4 if the computer program product is executed on a processor of the electronic computing device 3.

The invention claimed is:

1. A method for determining a state of a tailgate of a pickup vehicle using a camera system of the platform vehicle, the method comprising:
    capturing a cargo bed of the pickup vehicle in an image captured using a camera of the camera system;
    determining a first region of interest in the captured image using an electronic computing device of the camera system, wherein the first region of interest includes the tailgate at least partially;
    determining a parameter that characterizes the tailgate, the determining of the parameter being based on the captured image;
    generating a first histogram based on the first region of interest;
    generating a second histogram based on a second region of interest;
    determining a first pixel value as the parameter in the first histogram, and a second pixel value as the parameter in the second histogram; and
    determining a state of the tailgate as a closed state or an opened state, the determining of the state being based on a contrast comparison of the first pixel value of the first histogram and the second pixel value of the second histogram.

2. The method according to claim 1, further comprising:
    determining, using the electronic computing device, at least one region of interest based on a histogram backprojection.

3. The method according to claim 1, further comprising:
    using the electronic computing device, determining a second region of interest, which at least partially includes the cargo bed; and
    determining the parameter based on the second region of interest.

4. The method according to claim 3, wherein,
    using the electronic computing device, the closed state is determined when a predetermined number of non-zero pixel values of the pixel values is determined in the first region of interest; and
    the opened state is determined when a predetermined number of zero pixel values of the pixel values is determined in the first region of interest.

5. The method according to claim 1, wherein,
    using the electronic computing device, the analyzing of the first region of interest is performed based on a Hough transformation; and
    the state of the tailgate is determined based on the analysis of the first region of interest.

6. The method according to claim 1, wherein, using the electronic computing device, the first region of interest is determined based on at least one predetermined size indication of the cargo bed.

7. The method according to claim 1, wherein, using the electronic computing device, the first region of interest is determined based on at least one extrinsic parameter of the camera.

8. The method according to claim 1, wherein the first region of interest is subdivided into a plurality of subregions, and wherein the method further comprises:
    using the electronic computing device, determining, for a respective subregion, a respective motion vector of the subregion as the parameter; and
    determining the state of the tailgate based on a plurality motion vectors determined for the plurality of the subregions.

9. The method according to claim 8, wherein, using the electronic computing device, the respective motion vector is determined based on an analysis of an optical flow within the respective subregion.

10. The method according to claim 1, wherein, using the electronic computing device, the state of the tailgate is determined based on a contrast comparison in the image and based on a motion vector analysis in the image.

11. A non-transitory computer-readable medium comprising instructions that, when executed by one or more processors of a machine, cause the machine to perform operations comprising:
    capturing a cargo bed of the pickup vehicle in an image captured by a camera of a camera system;
    determining a first region of interest in the captured image by an electronic computing device of the camera system, wherein the first region of interest includes the tailgate at least partially;
    determining a parameter that characterizes the tailgate, the determining of the parameter being based on the captured image;
    generating a first histogram based on the first region of interest;
    generating a second histogram based on a second region of interest;
    determining a first pixel value as the parameter in the first histogram, and a second pixel value as the parameter in the second histogram; and
    determining a state of the tailgate as a closed state or an opened state, the determining of the state being based on a contrast comparison of the first pixel value of the first histogram and the second pixel value of the second histogram.

12. A system comprising:
    one or more hardware processors; and
    a non-transitory computer-readable medium for storing instructions that, when executed by the one or more hardware processors, cause the one or more hardware processors to perform operations comprising:
        capturing a cargo bed of the pickup vehicle in an image captured by a camera of a camera system;
        determining a first region of interest in the captured image by an electronic computing device of the camera system, wherein the first region of interest includes the tailgate at least partially;
        determining a parameter that characterizes the tailgate, the determining of the parameter being based on the captured image;
        generating a first histogram based on the first region of interest;
        generating a second histogram based on a second region of interest;

determining a first pixel value as the parameter in the first histogram, and a second pixel value as the parameter in the second histogram; and determining a state of the tailgate as a closed state or an opened state, the determining of the state being based on a contrast comparison of the first pixel value of the first histogram and the second pixel value of the second histogram.

13. A camera system for a pickup vehicle, comprising:

at least one camera;

an electronic computing device including one or more hardware processors; and a non-transitory computer-readable medium for storing instructions that, when executed by the electronic computing device, cause the electronic computing device to perform operations comprising:

capturing a cargo bed of the pickup vehicle in an image captured by the at least one camera;

determining a first region of interest in the captured image by the electronic computing device, wherein the first region of interest includes the tailgate at least partially;

determining a parameter that characterizes the tailgate, the determining of the parameter being based on the captured image;

generating a first histogram based on the first region of interest;

generating a second histogram based on a second region of interest;

determining a first pixel value as the parameter in the first histogram, and a second pixel value as the parameter in the second histogram; and determining a state of the tailgate as a closed state or an opened state, the determining of the state being based on a contrast comparison of the first pixel value of the first histogram and the second pixel value of the second histogram.

* * * * *